United States Patent
Zheng et al.

(10) Patent No.: US 12,373,268 B2
(45) Date of Patent: Jul. 29, 2025

(54) HYBRID COMPUTING SYSTEM MANAGEMENT

(71) Applicant: INTERNATIONAL BUSINESS MACHINES CORPORATION, Armonk, NY (US)

(72) Inventors: Xin Zheng, Beijing (CN); Ting Xie, Beijing (CN); Wen Hua Sun, Beijing (CN); Jing Zhao, Beijing (CN); Guan Jun Liu, Beijing (CN); XiaoWan Lu, Beijing (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 17/381,232

(22) Filed: Jul. 21, 2021

(65) Prior Publication Data
US 2023/0025434 A1 Jan. 26, 2023

(51) Int. Cl.
*G06F 9/54* (2006.01)
*G06F 9/50* (2006.01)
*G06N 5/02* (2023.01)

(52) U.S. Cl.
CPC ............ *G06F 9/547* (2013.01); *G06F 9/5027* (2013.01); *G06F 9/505* (2013.01); *G06F 9/5083* (2013.01); *G06N 5/02* (2013.01)

(58) Field of Classification Search
CPC ........ G06F 9/547; G06F 9/5027; G06F 9/505; G06F 9/5083; G06N 5/02
See application file for complete search history.

(56) References Cited

U.S. PATENT DOCUMENTS

| 2006/0095917 A1* | 5/2006 | Black-Ziegelbein ....................... G06F 9/5061 718/104 |
|---|---|---|
| 2011/0145153 A1 | 6/2011 | Dawson |

(Continued)

FOREIGN PATENT DOCUMENTS

| CN | 112000459 A | 11/2020 |
|---|---|---|
| DE | 1120130008655 T5 | 11/2014 |
| WO | 2023000806 A1 | 1/2023 |

OTHER PUBLICATIONS

Simmons et al.; Managing a SaaS Application in the Cloud Using PaaS Policy Sets and a Strategy-Tree; 2011; 5 pages (Year: 2011).*

(Continued)

*Primary Examiner* — Kevin L Young
*Assistant Examiner* — Kimberly L Jordan
(74) *Attorney, Agent, or Firm* — CHIP LAW GROUP

(57) ABSTRACT

A method, a system and a computer program product for hybrid computing system management are proposed. In the method, workload information associated with a set of application server instances running in a first computing system is obtained by a server controller in response to a scaling request for changing the number of instances in the set of application server instances from a request controller. The set of application server instances serves at least one application running in a second computing system. A scaling decision indicating whether to change the number of instances in the set of application server instances is determined by a predictor based on the workload information from the server controller. The second computing system is enabled by the request controller to handle requests associated with the at least one application for the set of application server instances based on the scaling decision.

13 Claims, 9 Drawing Sheets

(56) References Cited

U.S. PATENT DOCUMENTS

| | | | |
|---|---|---|---|
| 2013/0174168 | A1 | 7/2013 | Abuelsaad |
| 2015/0180949 | A1 | 6/2015 | Maes |
| 2018/0365116 | A1 | 12/2018 | Basham |
| 2019/0140894 | A1 | 5/2019 | Gujarathi |
| 2019/0155661 | A1 | 5/2019 | Aronovich |
| 2019/0190797 | A1 | 6/2019 | Asthana |
| 2020/0004589 | A1 | 1/2020 | Geiger |
| 2020/0218580 | A1 | 7/2020 | Kim |
| 2020/0274758 | A1 | 8/2020 | Sudhakaran |
| 2020/0349430 | A1* | 11/2020 | Schmidtler ............ G06N 3/084 |
| 2021/0081243 | A1* | 3/2021 | Jain ....................... G06F 9/5005 |
| 2021/0109789 | A1 | 4/2021 | McWeeney |
| 2022/0027197 | A1* | 1/2022 | Tang ..................... G06F 9/5072 |
| 2022/0353201 | A1* | 11/2022 | Navali ................ H04L 41/5054 |

OTHER PUBLICATIONS

Ghanbari et al.; Exploring alternative approaches to implement an elasticity policy; 2011; 8 pages (Year: 2011).*

Notification of Transmittal of the International Search Report and the Written Opinion of the International Searching Authority, or the Declaration, Date of mailing Aug. 24, 2022, Applicant's or agent's file reference IEE220380PCT, International application No. PCT/CN2022/094584, 9 pages.

Mell et al., "The NIST Definition of Cloud Computing", Recommendations of the National Institute of Standards and Technology, Special Publication 800-145, Sep. 2011, 7 pages.

Pending U.S. Appl. No. 16/986,805, filed Aug. 6, 2020, entitled; "Intelligent Scaling in Microservice-Based Distributed Systems", 49 pages.

\* cited by examiner

500A

|  | PARAMETER | STANDARD THRESHOLD | REDUCTION THRESHOLD | INCREASE THRESHOLD |
| --- | --- | --- | --- | --- |
| REQUEST LEVEL | MANAGER CONNECTIONS | 200-300 | 100-150 | 500-650 |
| REQUEST LEVEL | SOCKET CONNECTIONS | 200-280 | 80-150 | 380-450 |
| INSTANCE LEVEL | TPS | 30000-40000 | 10000-20000 | 30000-40000 |
| SYSTEM LEVEL | CPU USAGE | 40%-45% | 25%-35% | 55%-65% |

HYBRID COMPUTING SYSTEM MANAGEMENT

BACKGROUND

The present disclosure relates to system management, and more specifically, to a method, system and computer program product for hybrid computing system management.

Hybrid computing system, such as hybrid cloud, is made up of different cloud platforms managed by different operation management systems. In some instances, core cloud platforms in the hybrid cloud have limited capacity or resources. If the core cloud platforms serving critical applications accepts the scaling out or scaling in requests without verifying, the core cloud platforms may waste unnecessary resources and the applications may slow down and finally stop. Traditional hybrid computing system management is inefficient in dealing with these issues.

SUMMARY

According to one embodiment of the present disclosure, there is provided a computer-implemented method. According to the method, workload information associated with a set of application server instances running in a first computing system is obtained by a server controller in response to a scaling request for changing the number of instances in the set of application server instances from a request controller. The set of application server instances serves at least one application running in a second computing system. A scaling decision indicating whether to change the number of instances in the set of application server instances is determined by a predictor based on the workload information from the server controller. The second computing system is enabled by the request controller to handle requests associated with the at least one application for the set of application server instances based on the scaling decision.

According to another embodiment of the present disclosure, there is provided a system. The system including a server controller, configured to obtain workload information associated with a set of application server instances running in a first computing system in response to a scaling request for changing the number of instances in the set of application server instances from a request controller, the set of application server instances serving at least one application running in a second computing system; a predictor, configured to determine, based on the workload information from the server controller, a scaling decision indicating whether to change the number of instances in the set of application server instances; and the request controller, configured to enable, based on the scaling decision, the second computing system to handle requests associated with the at least one application for the set of application server instances.

According to yet another embodiment of the present disclosure, there is provided a computer program product including a computer-readable storage medium having program instructions embodied therewith. The program instructions are executable by a processor to cause the processor to perform acts of: obtaining, by a server controller, workload information associated with a set of application server instances running in a first computing system in response to a scaling request for changing the number of instances in the set of application server instances from a request controller, the set of application server instances serving at least one application running in a second computing system; determining, by a predictor, based on the workload information from the server controller, a scaling decision indicating whether to change the number of instances in the set of application server instances; and enabling, by the request controller, based on the scaling decision, the second computing system to handle requests associated with the at least one application for the set of application server instances.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
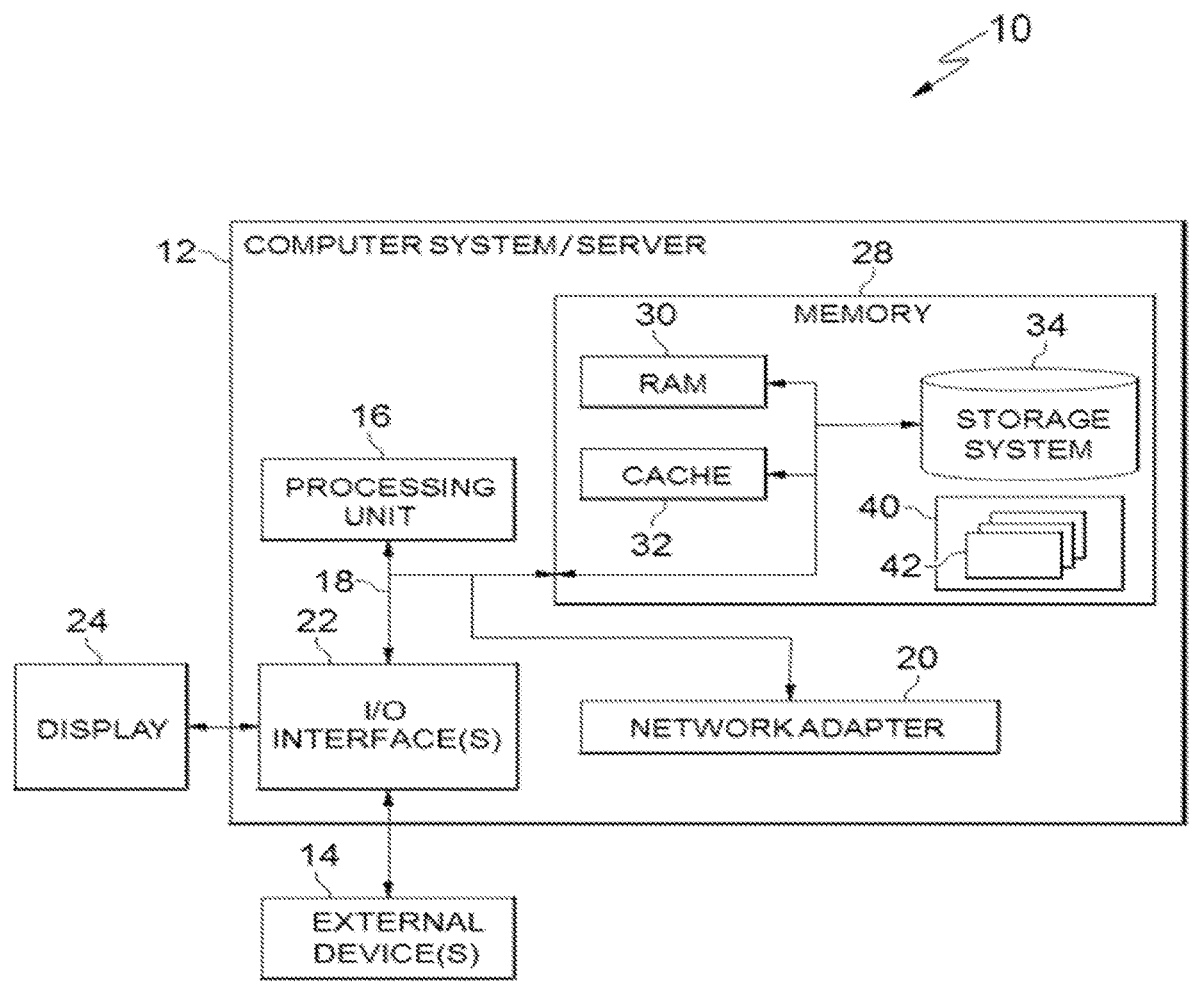
FIG. 1 depicts a cloud computing node according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The network adapter 20, or interface, may be a TCP/IP adapter card or wireless communication adapter (such as a 4G wireless communication adapter using OFDMA technology). Program modules 42 may be downloaded to the computing device from an external computer or external storage device via a network (for example, the Internet, a local area network or other wide area network or wireless network) and network adapter 20 or interface. From the network adapter 20 or interface, the programs may be loaded onto storage system 34. The network may comprise copper wires, optical fibers, wireless transmission, routers, firewalls, switches, gateway computers and/or edge servers.

Figure 2:
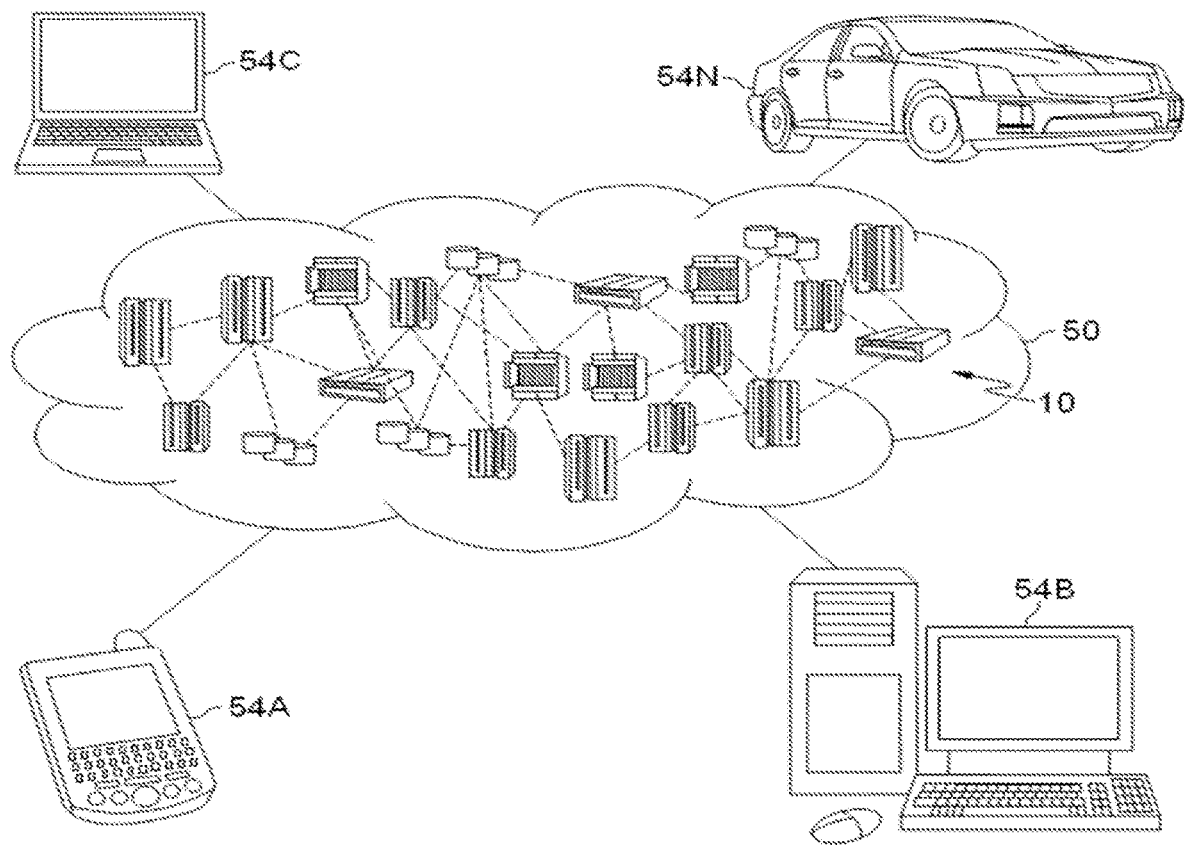
FIG. 2 depicts a cloud computing environment according to an embodiment of the present disclosure.

Referring now to FIG. 2, illustrative cloud computing environment 50 is depicted, in an embodiment. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
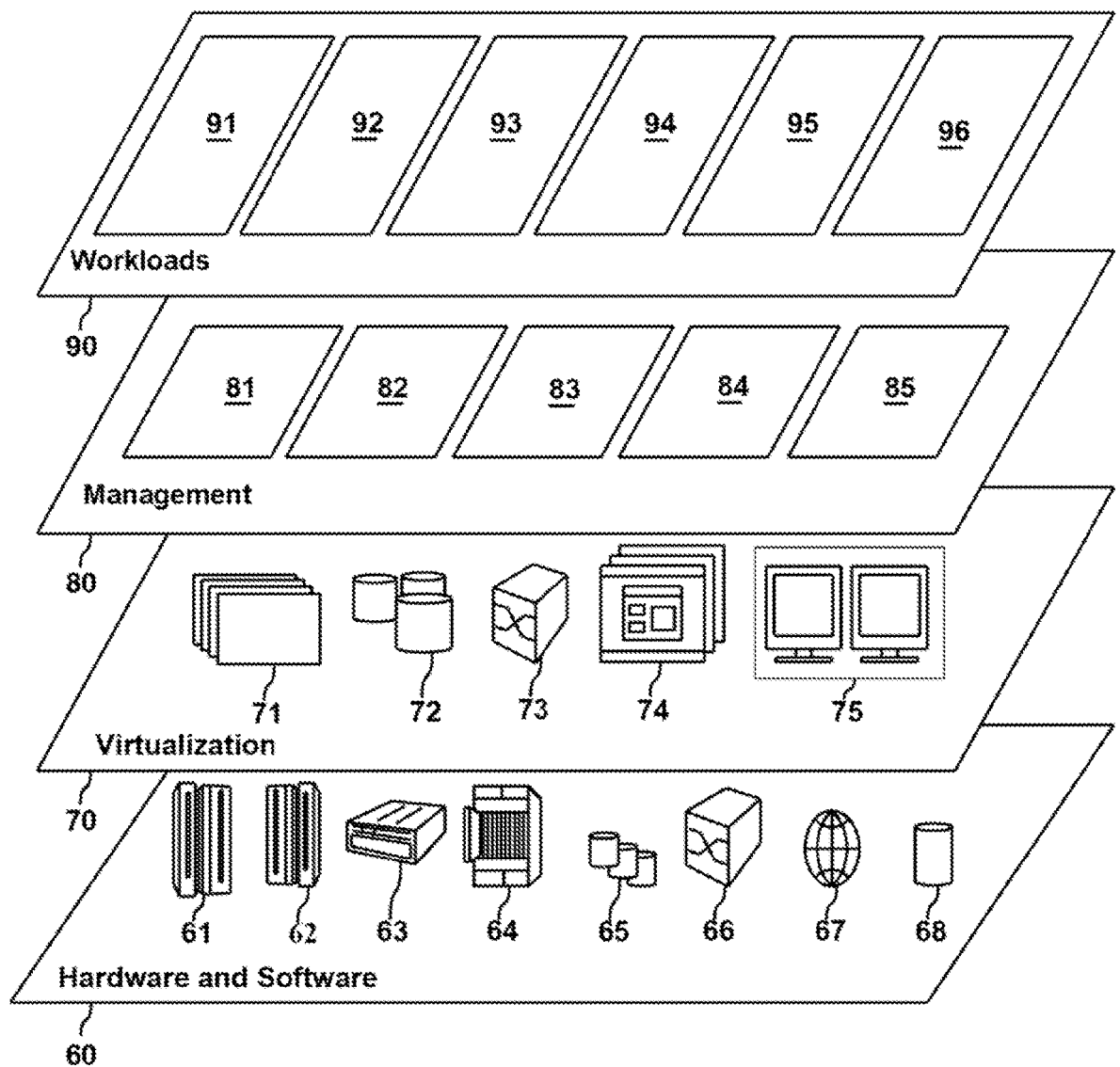
FIG. 3 depicts abstraction model layers according to an embodiment of the present disclosure.

Referring now to FIG. 3, a set of functional abstraction layers provided by cloud computing environment 50 (FIG. 2) is shown, in an embodiment. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid computing system management 96.

As described above, the core cloud platforms in the hybrid cloud may have limited capacity or resources, and the acceptance of the scaling out or scaling in requests without verifying may degrade the performance of the hybrid cloud and the user experience.

For example, it is assumed that the hybrid cloud includes frontend clouds A and B and a core cloud Z. The clouds A and B run frontend applications, and the core cloud Z runs application server instances serving the frontend applications. For example, in a banking system, the cloud A may run mobile bank applications, and the cloud B may run ATM (Automatic Teller Machine) bank applications. These applications in the clouds A and B may connect to core banking applications running in application server instances in the core cloud Z. The core cloud Z should assign 60% resource for the cloud A, and 10% resource for the cloud B. However, the core cloud Z is of limited resources.

In this case, if the core cloud Z accepts a scaling request from the cloud A or B without verifying, the limited resources of the core cloud Z will be wasted or exhausted. Here the scaling request may request the core cloud Z to deploy or un-deploy at least one application server instance based on the number of requests received from the cloud A or B. In addition, if the core cloud Z exhausts all the resources for satisfying the scaling request, the frontend applications running in the clouds A and B will be blocked by continually incoming new requests. Either of these two scenarios is undesirable, which will degrade the performance of the hybrid cloud and the user experience.

An improved solution for hybrid computing system management is provided in present disclosure. Generally speaking, according to embodiments of the present disclosure, workload information associated with a set of application server instances running in a first computing system is obtained by a server controller in response to a scaling request for changing the number of instances in the set of application server instances from a request controller. The set of application server instances serves at least one application running in a second computing system. A scaling decision indicating whether to change the number of instances in the set of application server instances is determined based on the workload information. The second computing system is enabled to handle requests associated with the at least one application for the set of application server instances based on the scaling decision.

In accordance with the hybrid computing system management as proposed herein, the requests from the second computing system are handled based on the workload of the first computing system. In this case, resources of the first computing system will not be wasted or exhausted, and the application running in the second computing system will not be blocked. Thus, the performance of the hybrid computing system can be improved.

Figure 4:
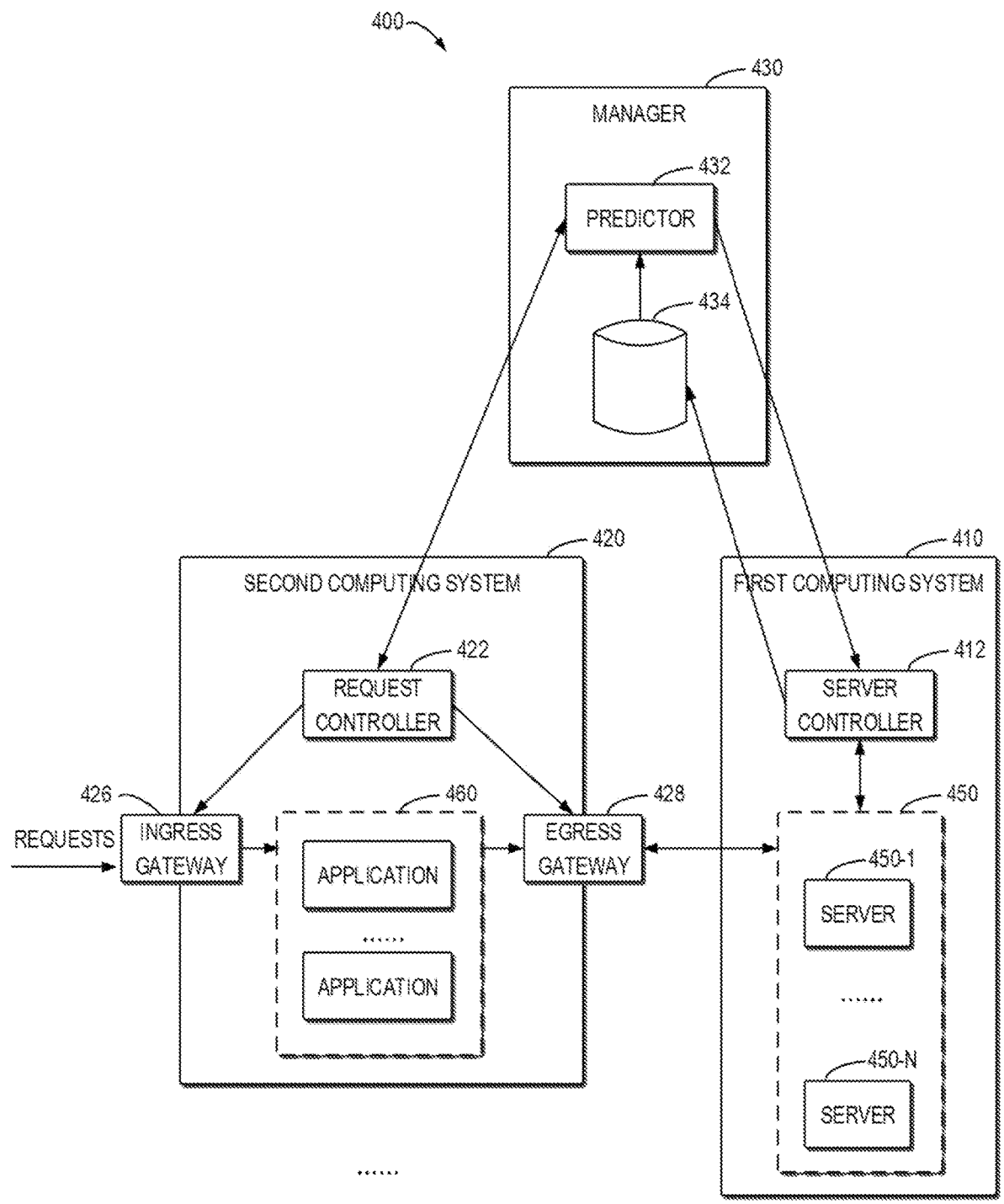
FIG. 4 depicts a schematic diagram of an example of a hybrid computing system management environment in which an embodiment of the present disclosure can be implemented.

Now some example embodiments will be described with reference to FIGS. 4-9. FIG. 4 depicts a schematic diagram of an example of a hybrid computing system management environment 400 in which some embodiments of the present disclosure can be implemented.

The hybrid computing system management environment 400 may include a first computing system 410 and a second computing system 420. In some embodiments, the first and second computing systems may be clouds, distributed computing systems or the like.

The first and second computing systems 410 and 420 may form a hybrid computing system, such as a hybrid cloud. In this case, the first computing system 410 may be a core computing system running at least one application server instance, such as server instances 450-1 to 450-N (collectively referred to as "a set of application server instances 450", wherein N is an integer larger than 1). In some embodiments, the first computing system 410 may be of limited capacity or resources. The second computing system 420 may be a frontend computing system running at least one application 460 served by the set of application server instances 450.

It should be understood that although only one frontend computing system is shown in FIG. 4, there may be a plurality of frontend computing systems that form the hybrid computing system with the core computing system.

In addition, the hybrid computing system management environment 400 may also include a manager 430 for managing the hybrid computing system. The manager 430 may be implemented, for example, in the computer system/server 12 of FIG. 1.

In some embodiments, a server controller 412, such as the computer system/server 12 of FIG. 1 and shown in the first computing system 410, may dynamically collect workload information associated with the set of application server instances 450. It should be understood that although the server controller 412 is shown in the first computing system 410, the server controller 412 may be implemented in the manager 430.

In some embodiments, the server controller 412 may store the workload information into storage 434 of the manager 430. For example, the storage 434 may be any appropriate storage, such as a cache, a memory, a database, a storage device, a distributed storage system, or the like, such as the storage system 34 of FIG. 1. In some embodiments, the server controller 412 may send the workload information directly to a predictor 432 of the manager 430.

The workload information can be shared by the first, second computing systems 410, 420, for scaling on the first computing system 410. For example, the workload information may include resource and/or task information, such as a number of connections established at the first computing system 410, a number of tasks processed at the first computing system 410, a resource consumption at the first computing system 410, a number of requests received at the first computing system 410, or the like.

The second computing system 420 may receive, at an ingress gateway 426 of the second computing system 420, incoming requests associated with the at least one application 460 for the set of application server instances 450. These requests or further requests generated from these requests may be transmitted, by an egress gateway 428 of the second computing system 420, to the first computing system 410 for processing with at least one of the set of application server instances 450.

In some embodiments, the number of incoming requests received at the ingress gateway 426 may be tremendous or scarce. In either of these cases, the number of the application server instances in the set of application server instances 450 may be changed to adapt to the changing environment.

Specifically, if the number of incoming requests is larger than an upper threshold, the first computing system 410 may be scaled out accordingly. Specifically, new application server instance(s) need to be deployed in the set of application server instances 450. On the other hand, if the number of incoming requests is below a lower threshold, the first computing system 410 may be scaled in accordingly. That is to say, existing application server instance(s) in the set of application server instances 450 may need to be un-deployed.

A request controller 422 may monitor the number of incoming requests received at the ingress gateway 426, and transmit a scaling request to a predictor 432 of the manager 430 for scaling decision. The scaling request is used for changing a number of instances in the set of application server instances. If the scaling decision is a scaling out decision, i.e., a provision decision, the number of instances in the set of application server instances should be increased, and if the scaling decision is a scaling in decision, i.e., a de-provision decision, the number of instances in the set of application server instances should be decreased, and if the scaling decision is a keeping same decision, i.e., an as-is decision, the number of instances in the set of application server instances should be kept unchanged. It should be understood that although the request controller 422 is shown in the second computing system 420, the request controller 422 may be implemented in the manager 430.

After receiving the scaling request, the predictor 432 may verify the scaling request by obtaining the workload information, either from the storage 434 or from the server controller 412, and determining, based on the workload information, the scaling decision which indicates whether to change the number of instances in the set of application server instances 450.

For example, the predictor 432 may employ any appropriate techniques, such as random forest, least square polynomial fitting, unary linear regression, multiple linear regression, nonlinear approaches, Markov chains forecasting, data mining, neural networks, etc. to generate the scaling decision. In some embodiments, the predictor 432 may be trained offline based on historical workload information and a historical scaling decision corresponding to the historical workload information. The historical scaling decision may indicate whether to change the number of instances in the set of application server instances 450 at that time. In some embodiments, the predictor 432 may be initially trained offline based on historical workload information and a historical scaling decision corresponding to the historical workload information, and stored workload information and obtained scaling decision may be used to further on-going retrain the predictor 432.

Figures 5A, 5B:
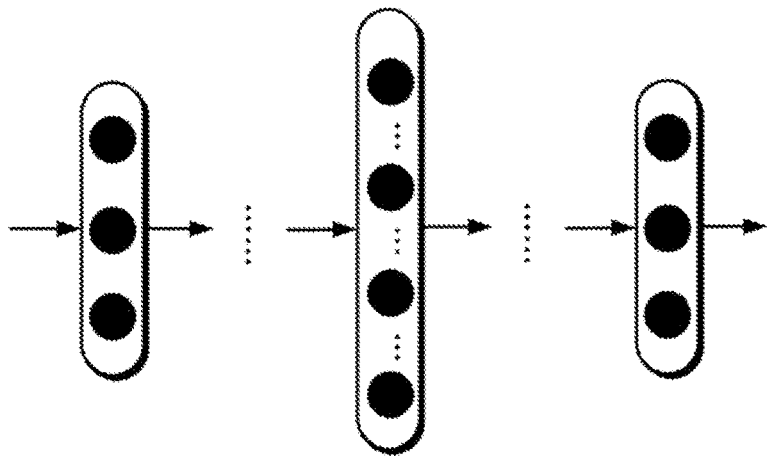
FIG. 5A depicts a schematic diagram of example data for training a predictor according to an embodiment of the present disclosure.
FIG. 5B depicts a schematic diagram of an example model structure of a predictor according to an embodiment of the present disclosure.

FIG. 5A depicts a schematic diagram of example data 500A for training the predictor 432 according to an embodiment of the present disclosure.

As described above, the workload information may include resource and/or task information, such as the number of connections established at the first computing system 410, the number of tasks processed at the first computing system 410, the number of requests received at the first computing system 410, or the like. For example, the number of connections established at the first computing system 410 may be a number of socket connections or a number of connections to the manager 430, and the like. The number of tasks processed at the first computing system 410 may be quantified as transaction per second (TPS). The resource consumption at the first computing system 410 may be determined by central processing unit (CPU) usage.

In this case, as shown in FIG. 5A, parameters of the workload information may include a number of manager connections at a request level, a number of socket connections at the request level, a TPS at an instance level and CPU usage at a system level. The range of the values of these parameters may be classified into three categories.

A value of the parameters which indicates that the number of instances in the set of application server instances 450 may be considered at a standard threshold and should not be changed include: the number of manager connections is at a request level between 200 and 300, a number of socket connections is at a request level between 200 and 280, a TPS is at an instance level between 30,000 and 40,000 and a CPU usage is at a system level between 40% and 45%.

A value of the parameters which indicates that the number of instances in the set of application server instances 450 may be considered at a reduction threshold and should be reduced include: the number of manager connections is at a request level between 100 and 150, a number of socket connections is at a request level between 80 and 150, a TPS is at an instance level between 10,000 and 20,000 and a CPU usage is at a system level between 25% and 35%.

A value of the parameters which indicates that the number of instances in the set of application server instances 450 may be considered at a increase threshold and should be increased include: the number of manager connections is at a request level between 500 and 650, a number of socket connections is at a request level between 380 and 450, a TPS is at an instance level between 30,000 and 40,000 and a CPU usage is at a system level between 55% and 65%.

FIG. 5B depicts a schematic diagram of an example model structure of a predictor 500B according to an embodiment of the present disclosure. The example model structure of the predictor 500B may be an example of the model structure of the predictor 432. The example model structure of the predictor 500B may employ any appropriate neutral network model or machine learning model.

The example model structure of the predictor 500B may include a plurality of layers each including a plurality of neurons or nodes. The input of the predictor 500B may include historical workload information, such as values of the above parameters of the workload information, as shown in FIG. 5A. In addition, the input may also include a historical scaling decision corresponding to the historical workload information. For example, the historical workload information may be tagged with the historical scaling decision, as described above in the description of FIG. 5A. The historical scaling decision may indicate whether to change the number of instances in the set of application server instances, such as, the scaling out decision, i.e., the provision decision; the scaling in decision, i.e., the de-provision decision; or the keeping same decision, i.e., the as-is decision.

In some embodiments, the input of the predictor 500B may be a features representation or a feature vector generated from the historical workload information and the output may be a probability vector indicating the historical scaling decision. For example, the input may be the vector representation of values of the above parameters of the workload information. The historical scaling decision may also be mapped to a set of probabilities or a probability vector, such as (1, 0, 0) indicating a scaling out decision, (0, 1, 0) indicating an as-is decision, and (0, 0, 1) indicating a scaling in decision.

After applying the input to the predictor 500B, the predictor 500B may generate a predicted scaling decision, such as a set of probabilities or a probability vector, e.g., (0.9, 0.1, 0). During training of the predictor 500B, the predictor 500B is trained to minimizing a difference between a predicted scaling decision and the historical scaling decision, i.e., the ground truth.

In this way, after the training, the trained predictor 500B may generate a predicted scaling decision based on the workload information. For example, if the set of probabilities or the probability vector generated by the trained example predictor 500B is (0.9, 0.1, 0) which approximates (1, 0, 0), the trained example predictor 500B may determine that the predicted scaling decision is a scaling out decision.

Returning to FIG. 4, in the case of scaling request being a scaling out request, if the scaling decision generated by the predictor 432 is a scaling out decision, i.e., the provision decision, the scaling request is acceptable for the first computing system 410 and provision of at least one additional application server instance is allowed. And if the scaling decision generated by the predictor 432 is a scaling in decision or the as-is decision, the scaling request is unacceptable for the first computing system 410 and provision of at least one additional application server instance is not allowed.

In addition, in the case of scaling request being a scaling in request, if the scaling decision generated by the predictor 432 is a scaling in decision, i.e., a de-provision decision, the scaling request is acceptable for the first computing system 410 and de-provision of at least one additional application server instance is allowed. And if the scaling decision generated by the predictor 432 is a scaling out decision or an as-is decision, the scaling request is unacceptable for the first computing system 410 and de-provision of at least one additional application server instance is not allowed.

The predictor 432 may transmit the scaling decision to the request controller 422 and the server controller 412. The server controller 412 may control to deploy or un-deploy application server instance(s) in the set of application server instances 450 based on the scaling decision. In some embodiments, the server controller 412 may control a provision service of the first computing system 410 to perform the provision or de-provision.

In addition, it is assumed that the scaling request is a scaling out request. Then if the scaling decision indicates that provision of at least one additional application server instance is allowed, i.e., the scaling decision is the scaling out decision, the request controller 422 may control the ingress gateway 426 or the egress gateway 428 to accept new requests. For example, the request controller 422 may control the egress gateway 428 to route new requests to the newly provisioned application server instance(s). In addition, the server controller 412 may control to deploy the at least one additional application server instance. The number of the additional application server instances to be deployed can be determined by the first computing system 410 using existing technologies. Otherwise, if the scaling decision indicates that provision of at least one additional application server instance is not allowed, i.e., the scaling decision is the scaling in decision or the as-is decision, the request controller 422 may control the ingress gateway 426 or the egress gateway 428 to reject new requests. For example, the request controller 422 may control the ingress gateway 426 to limit incoming requests.

Further, it is assumed that the scaling request is a scaling in request. Then if the scaling decision indicates that at least one application server instance of the set of application server instances 450 is to be un-deployed, i.e., the scaling decision is the scaling in decision, the request controller 422 may control the egress gateway 428 to prevent sending new requests to the application server instance (s) to be un-deployed. For example, the request controller 422 may control the egress gateway 428 to stop routing new requests to the application server instance(s) to be un-deployed. And the number of the application server instances to be un-deployed can be determined by the first computing system using existing technologies. After all tasks in the application server instance(s) to be un-deployed have been executed, the server controller 412 may control to un-deploy these application server instance(s). In addition, if the scaling decision indicates that the scaling decision is the scaling out decision or the as-is decision, both the server controller 412 and the request controller 422 may do nothing.

In this way, the scaling request is intelligently verified based on the runtime workload information across the hybrid computing system, especially when the core computing system of the hybrid computing system is of limited capacity or resources. In addition, the workload information can be shared across the hybrid computing system and used to retrain the predictor 432 to facilitate scaling. Further, the ingress and egress gateways 426, 428, can be controlled to limit the incoming requests, and route the requests as indicated across the hybrid computing system. Thereby, the resources of the core computing system will not be wasted or exhausted, and the applications will not be blocked. Thus, the performance of the hybrid computing system can be improved.

The following text will describe the provision allowed scenario, the provision rejected scenario and the de-provision scenario in more detail.

Figure 6:
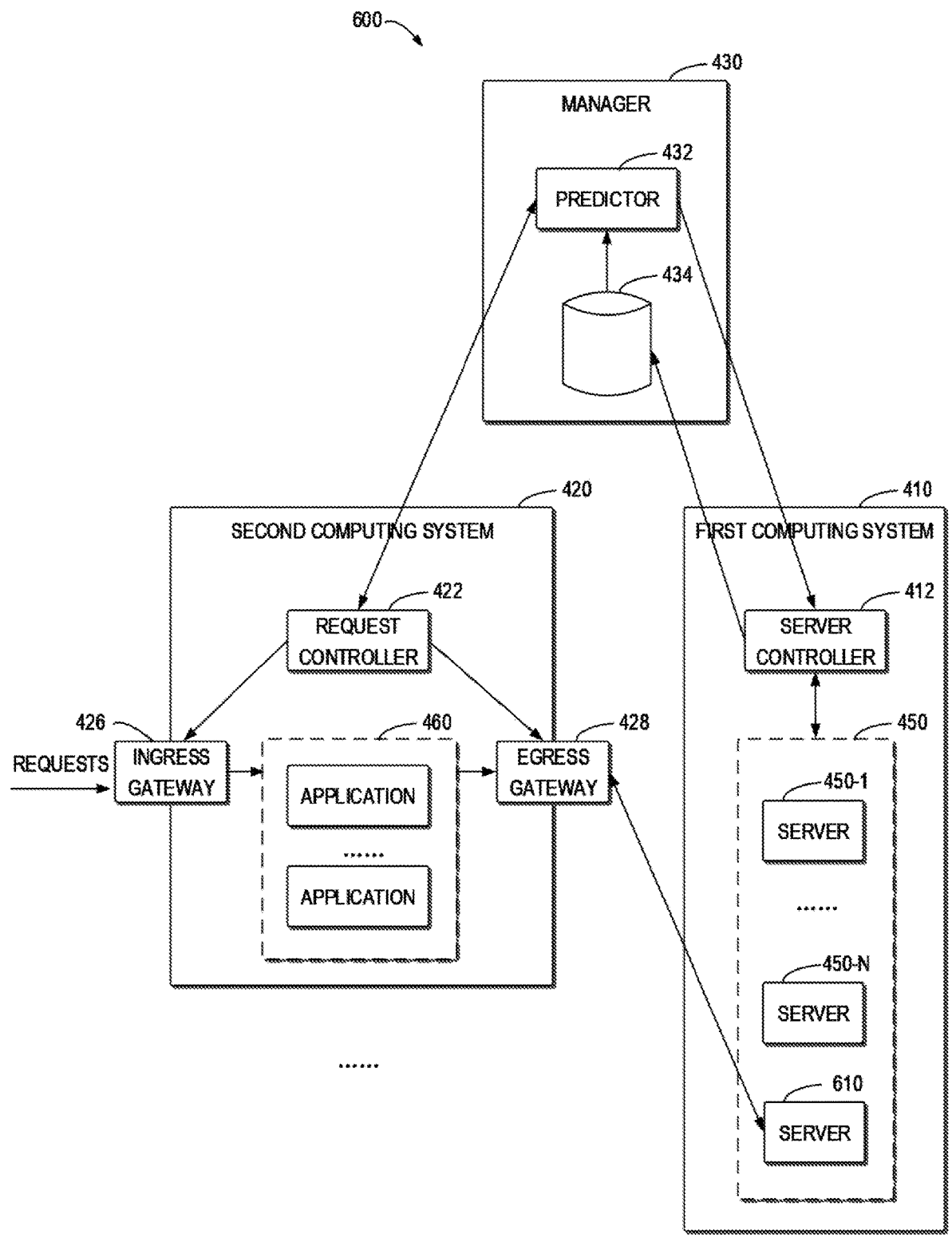
FIG. 6 depicts a schematic diagram of an example of provision of an additional application server instance being allowed according to an embodiment of the present disclosure.

FIG. 6 depicts a schematic diagram of an example 600 of provision of an additional application server instance being allowed according to an embodiment of the present disclosure.

In the example scenario as shown in FIG. 6, the second computing system 420 may receive, at the ingress gateway 426, incoming requests associated with the at least one application 460 for the set of application server instances 450. These requests or further requests generated from these requests may be transmitted, by the egress gateway 428, to the first computing system 410 for processing with at least one of the set of application server instances 450.

The request controller 422 may monitor the number of incoming requests received at the ingress gateway 426, and find that the number of incoming requests is larger than the upper threshold. In this case, the request controller 422 may transmit a scaling out request to the predictor 432 for scaling decision.

After receiving the scaling out request, the predictor 432 may obtain the workload information, and determine, based on the workload information, a scaling decision of whether to change the number of instances in the set of application server instances 450.

It is assumed that the scaling out request is acceptable for the first computing system 410. In this case, the predictor 432 may generate a scaling out decision indicating that the provision of at least one additional application server instance is allowed.

The predictor 432 may transmit the scaling out decision to the request controller 422 and the server controller 412. The server controller 412 may control to deploy at least one application server instance (such as an application server instance 610) in the set of application server instances 450 based on the scaling decision. In some embodiments, the server controller 412 may control the provision service of the first computing system 410 to deploy the at least one application server instance.

In addition, the request controller 422 may control the ingress gateway 426 or the egress gateway 428 to accept new requests. For example, the request controller 422 may control the egress gateway 428 to route new requests to the newly provisioned application server instance 610.

Figure 7:
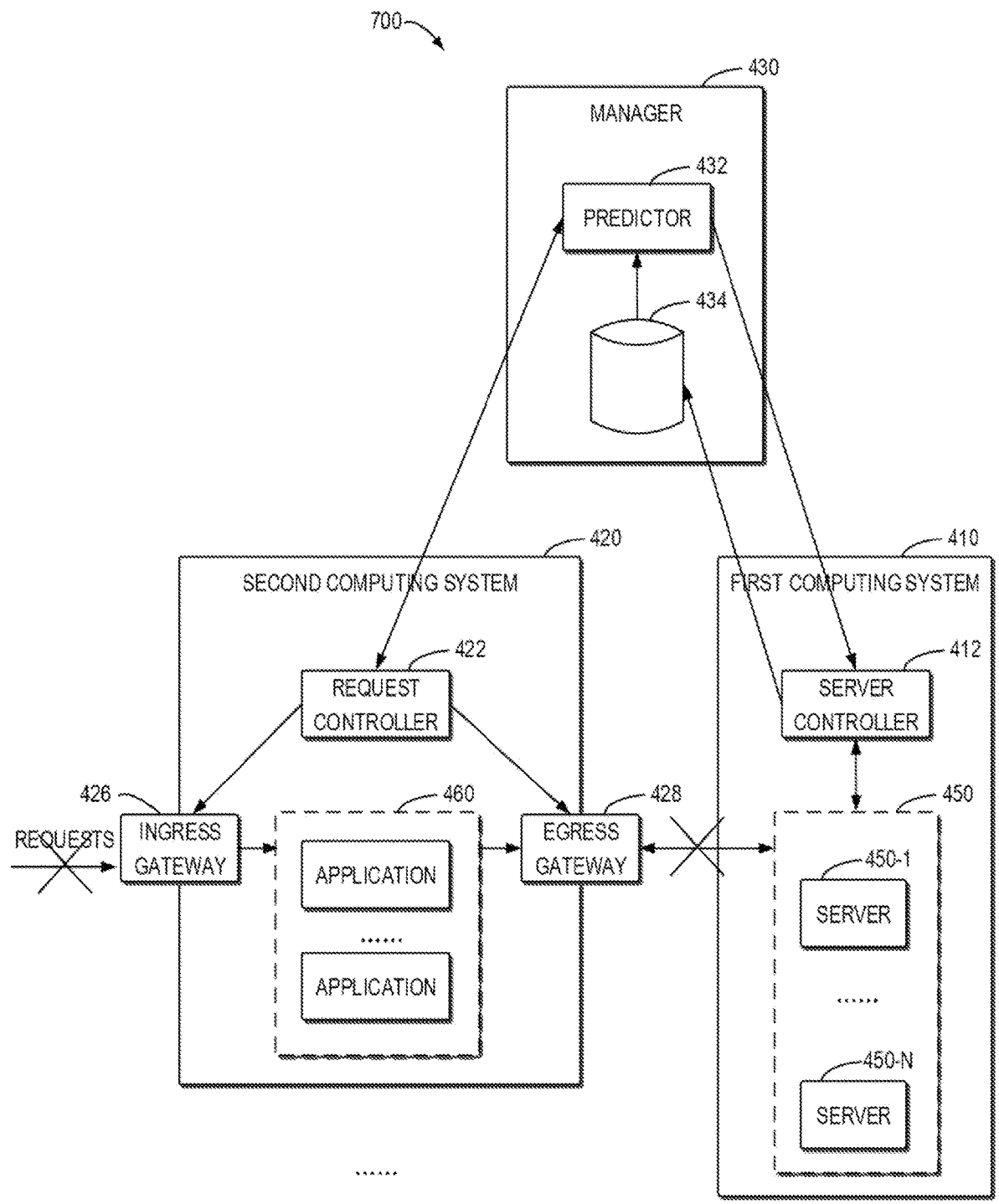
FIG. 7 depicts a schematic diagram of an example of provision of an additional application server instance failing to be allowed according to an embodiment of the present disclosure.

FIG. 7 depicts a schematic diagram of an example 700 of provision of an additional application server instance failing to be allowed according to an embodiment of the present disclosure.

In the example scenario as shown in FIG. 7, the second computing system 420 may receive, at the ingress gateway 426, incoming requests associated with the at least one application 460 for the set of application server instances 450. These requests or further requests generated from these requests may be transmitted, by the egress gateway 428, to the first computing system 410 for processing with at least one of the set of application server instances 450.

The request controller 422 may monitor the number of incoming requests received at the ingress gateway 426, and find that the number of incoming requests is larger than the upper threshold. In this case, the request controller 422 may transmit a scaling out request to the predictor 432 for scaling decision.

After receiving the scaling out request, the predictor 432 may obtain the workload information, and determine, based on the workload information, a scaling decision of whether to change the number of instances in the set of application server instances 450.

It is assumed that the scaling out request is unacceptable for the first computing system 410. In this case, the predictor 432 may generate a scaling in or as-is decision indicates that provision of at least one additional application server instance is not allowed.

The predictor 432 may transmit the scaling in or as-is decision to the request controller 422 and the server controller 412. The server controller 412 will not control to deploy an additional application server instance in the set of application server instances 450 based on the scaling in or as-is decision. In some embodiments, the server controller 412 may control the provision service of the first computing system 410 not to perform the provision.

In addition, the request controller 422 may control the ingress gateway 426 or the egress gateway 428 to reject new requests. For example, the request controller 422 may control the ingress gateway 426 to limit incoming requests.

Figure 8:
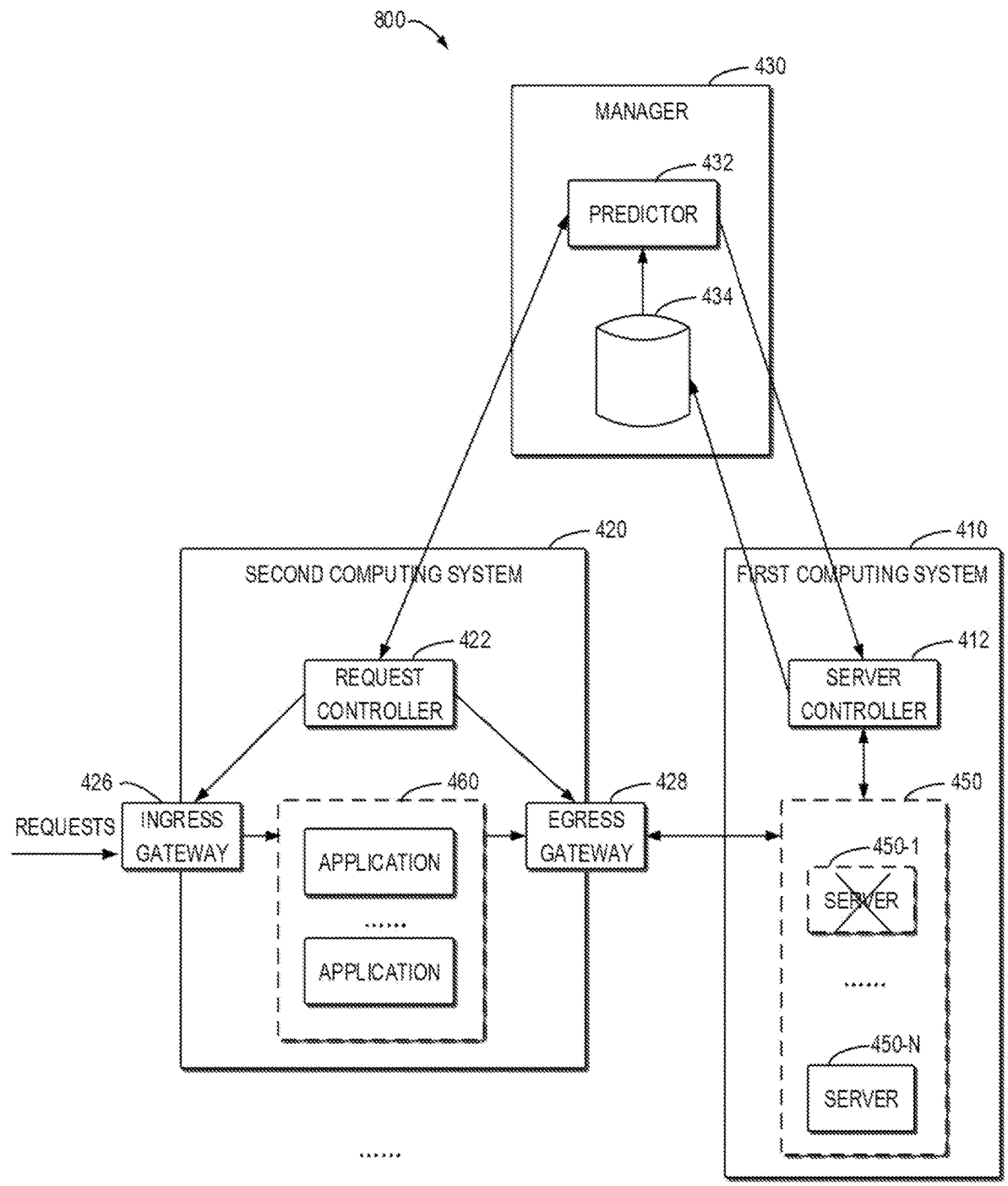
FIG. 8 depicts a schematic diagram of an example of de-provision of an application server instance according to an embodiment of the present disclosure.

FIG. 8 depicts a schematic diagram of an example 800 of de-provision of an application server instance according to an embodiment of the present disclosure.

In the example scenario as shown in FIG. 8, the second computing system 420 may receive, at the ingress gateway 426, incoming requests associated with the at least one application 460 for the set of application server instances 450. These requests or further requests generated from these requests may be transmitted, by the egress gateway 428, to the first computing system 410 for processing with at least one of the set of application server instances 450.

The request controller 422 may monitor the number of incoming requests received at the ingress gateway 426, and find that the number of incoming requests is below the lower threshold. In this case, the request controller 422 may transmit a scaling in request to the predictor 432 for scaling decision.

After receiving the scaling in request, the predictor 432 may obtain the workload information, and determine, based on the workload information, a scaling decision of whether to change the number of instances in the set of application server instances 450.

It is assumed that the scaling in request is acceptable for the first computing system 410. In this case, the predictor 432 may generate a scaling in decision indicates that at least one application server instance of the set of application server instances 450 is to be un-deployed.

The predictor 432 may transmit the scaling in decision to the request controller 422 and the server controller 412. The server controller 412 may control to un-deploy at least one application server instance (such as the application server instance 450-1) based on the scaling in decision. In some embodiments, the server controller 412 may control the provision service of the first computing system 410 to perform the de-provision.

In addition, the request controller 422 may control the egress gateway 428 to prevent sending new requests to the de-provisioned application server instance 450-1. For example, the request controller 422 may control the egress gateway 428 to stop routing new requests to the application server instance 450-1 to be un-deployed.

Further, in some embodiments, the predictor 432 may notify the first computing system 410 to un-deploy the at least one application server instance if all tasks in the at least one application server instance have been executed. In this case, if all tasks in execution are completed, the first computing system 410 may un-deploy the at least one application server instance.

Figure 9:
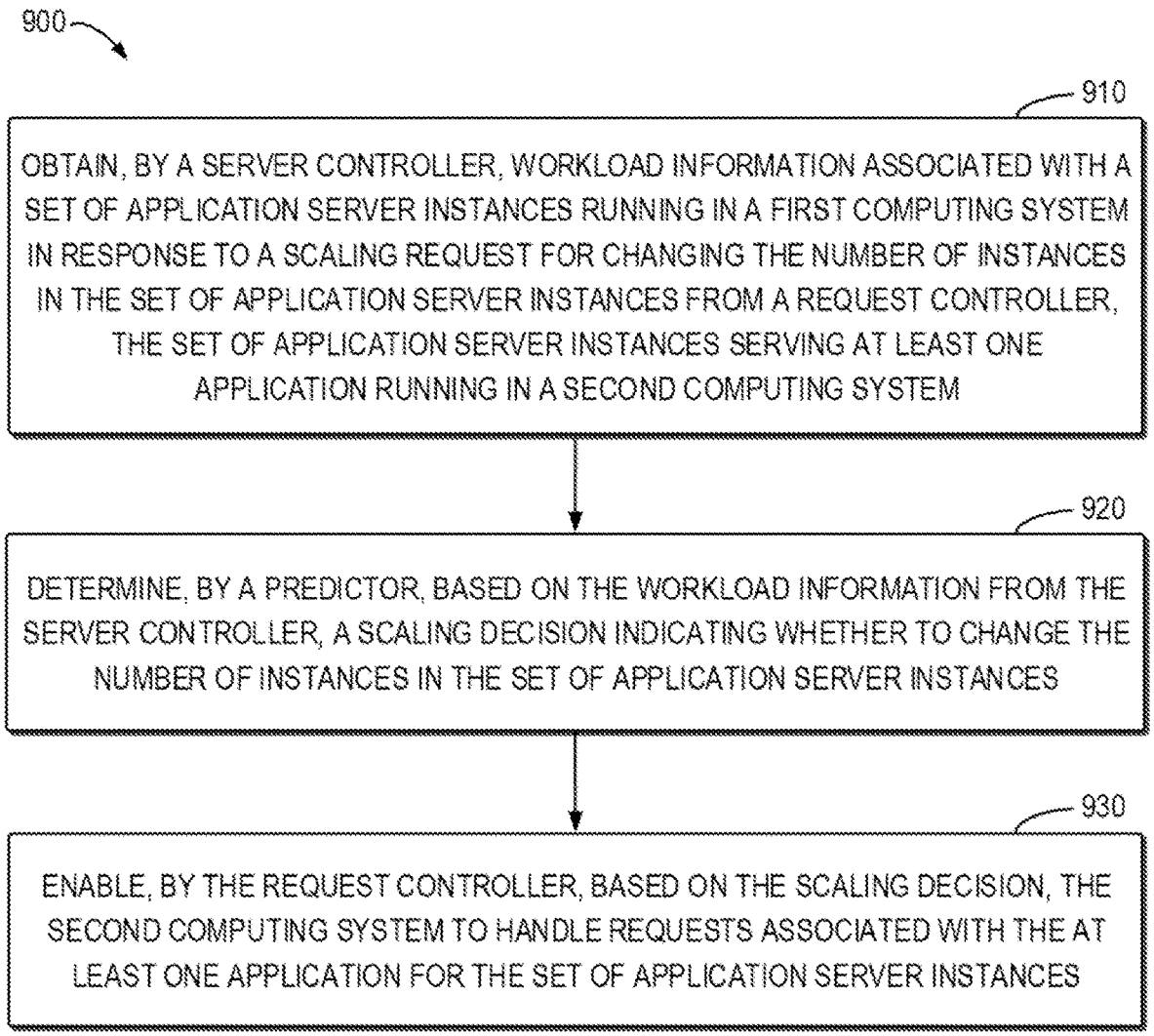
FIG. 9 depicts a flowchart of an example of a method for hybrid computing system management according to an embodiment of the present disclosure.

FIG. 9 depicts a flowchart of an example of a method 900 for hybrid computing system management according to an embodiment of the present disclosure. At 910, the server controller 412 may obtain workload information associated with a set of application server instances running in a first computing system 410 in response to a scaling request for changing the number of instances in the set of application server instances from a request controller 422. The set of application server instances serves at least one application running in a second computing system 420.

At 920, the predictor 432 may determine, based on the workload information from the server controller 412, a scaling decision indicating whether to change the number of instances in the set of application server instances.

At 930, the request controller 422 may enable, based on the scaling decision, the second computing system 420 to handle requests associated with the at least one application for the set of application server instances.

In some embodiments, in accordance with a determination that the number of incoming requests at the second computing system 420 exceeds an upper threshold by the request controller 422, the scaling request may be a scaling out request which requests to increase the number of instances in the set of application server instances.

In some embodiments, in accordance with a determination that the number of incoming requests at the second computing system 420 is below a lower threshold by the request controller 422, the scaling request may be a scaling in request which requests to decrease the number of instances in the set of application server instances.

In some embodiments, the workload information may indicate at least one of: the number of connections established at the first computing system 410, the number of tasks processed at the first computing system 410, resource consumption at the first computing system 410, and the number of requests received at the first computing system 410.

In some embodiments, the predictor 432 may generate the scaling decision based on the workload information. The predictor 432 may be trained based on historical workload information and a historical scaling decision corresponding to the historical workload information.

In some embodiments, in accordance with a determination that the scaling request is a scaling out request which requests to increase the number of instances in the set of application server instances and the scaling decision is a scaling out decision which indicates that provision of at least one additional application server instance is allowed, the server controller 412 may enable the first computing system 410 to deploy the at least one additional application server instance, the request controller 422 may enable the second computing system 420 to accept the requests.

In some embodiments, in accordance with a determination that the scaling request is a scaling out request which requests to increase the number of instances in the set of application server instance and the scaling decision is either a scaling in decision or an as-is decision, which indicates that provision of at least one additional application server instance is not allowed, the request controller 422 may enable the second computing system 420 to reject the requests.

In some embodiments, in accordance with a determination that the scaling request is a scaling in request which requests to decrease the number of instances in the set of application server instances and the scaling decision is a scaling in decision which indicates that at least one application server instance of the set of application server instances is to be de-provisioned, the request controller 422 may enable the second computing system 420 to prevent sending the requests to the at least one application server instance.

In some embodiments, in accordance with a determination that the scaling request is the scaling in request, the scaling decision is a scaling in decision, and all tasks in the at least one application server instance have been executed, the request controller 422 may enable the first computing system 410 to un-deploy the at least one application server instance.

It should be noted that the processing of hybrid computing system management according to embodiments of this disclosure could be implemented by the computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
training a predictor, based on a features representation generated from historical workload information and a historical scaling decision corresponding to the historical workload information, to minimize a difference between a predicted scaling decision and the historical scaling decision, wherein
the historical scaling decision is mapped to a probability vector indicating one of a scaling out decision, indicating an as-is decision, or indicating a scaling in decision,
the predictor generates the predicted scaling decision indicating whether to change a number of instances in a set of application server instances of a first computing system, and
the predictor is a machine learning model;
determining, by a request controller circuit, a number of requests at an ingress gateway of a second computing system is one of larger than an upper threshold or below a lower threshold, wherein
the set of application server instances serves at least one application running in the second computing system;
transmitting, by the request controller circuit, a scaling in request to the predictor in a case where the number of requests at the ingress gateway is below the lower threshold, wherein the scaling in request is to decrease the number of instances in the set of application server instances;
obtaining, by the predictor, workload information from a server controller circuit of the first computing system based on the scaling in request, wherein the workload information is associated with the set of application server instances running in the first computing system, wherein the server controller circuit controls deployment of the set of application servers;

determining, by the predictor, based on the workload information from the server controller circuit and the scaling in request, a scaling decision that is one of:
  the scaling in decision indicating that at least one application server instance of the set of application server instances is to be un-deployed, or
  the as-is decision or the scaling out decision indicating that un-deployment of the at least one application server instance is not allowed;
controlling, by the request controller circuit, an egress gateway of the second computing system to stop routing new requests to the at least one application server instance before the at least one application server instance is un-deployed, wherein
  the controlling of the egress gateway to stop routing the new requests is in a case where the scaling decision is the scaling in decision;
determining, by the server controller circuit, that tasks in an execution state in the at least one application server instance are completed, before the at least one application server instance is un-deployed,
  wherein the determining that the tasks in the at least one application server instance are completed is in the case where the scaling decision is the scaling in decision; and
un-deploying, by the first computing system, the at least one application server instance after the tasks in the at least one application server instance are determined as completed, wherein the at least one application server instance is undeployed in the case where the scaling decision is the scaling in decision.

2. The method of claim 1, further comprising transmitting, based on a determination that the number of requests at the ingress gateway of the second computing system is larger than the upper threshold, a scaling out request which requests to increase the number of instances in the set of application server instances.

3. The method of claim 1, wherein the workload information indicates at least one of:
  a number of connections established at the first computing system,
  a number of a plurality of tasks processed at the first computing system, wherein the plurality of tasks includes the tasks,
  resource consumption at the first computing system, and
  the number of requests received at the first computing system.

4. The method of claim 2, wherein the controlling of the second computing system further comprises:
  based on a determination that the scaling out request is transmitted which requests to increase the number of instances in the set of application server instances and a determination that the scaling decision is the scaling out decision which indicates that provision of at least one additional application server instance is allowed,
  controlling, by the server controller circuit, the first computing system to deploy the at least one additional application server instance; and
  controlling, by the request controller circuit, the second computing system to accept the new requests.

5. The method of claim 2, wherein the controlling of the second computing system further comprises
  controlling, by the request controller circuit, the second computing system to reject the number of requests based on the determination that the number of requests is larger than the upper threshold and a determination that:
    the scaling out request is transmitted which requests to increase the number of instances in the set of application server instances, and
    the scaling decision is either the scaling in decision or the as-is decision, which indicates provision of at least one additional application server instance is not allowed.

6. A computer system, comprising:
one or more computer processors;
one or more computer-readable storage media; and
program instructions stored on the one or more of the computer-readable storage media, the program instructions executable by at least one computer processor of the one or more computer processors to cause the at least one computer processor to:
  train a predictor, based on a features representation generated from historical workload information and a historical scaling decision corresponding to the historical workload information, to minimize a difference between a predicted scaling decision and the historical scaling decision, wherein
    the historical scaling decision is mapped to a probability vector indicating one of a scaling out decision, indicating an as-is decision, or indicating a scaling in decision,
    the predictor generates the predicted scaling decision indicating whether to change a number of instances in a set of application server instances of a first computing system, and
    the predictor is a machine learning model;
  determine a number of requests at an ingress gateway of a second computing system is one of larger than an upper threshold or below a lower threshold, wherein
    the set of application server instances serves at least one application running in the second computing system;
  control transmission, from a request controller circuit of the second computing system, of a scaling in request to the predictor in a case where the number of requests at the ingress gateway is below the lower threshold, wherein the scaling in request is to decrease the number of instances in the set of application server instances;
  control the predictor to obtain workload information from a server controller circuit of the first computing system based on the scaling in request, wherein the workload information is associated with the set of application server instances in the first computing system, wherein the server controller circuit controls deployment of the set of application servers;
  determine, based on the workload information from the server controller circuit and the scaling in request, a scaling decision that is one of:
    the scaling in decision indicating that at least one application server instance of the set of application server instances is to be un-deployed, or
    the as-is decision or the scaling out decision indicating that un-deployment of the at least one application server instance is not allowed;
  control an egress gateway of the second computing system to stop routing new requests to the at least one application server instance before the at least one application server instance is un-deployed, wherein
    the controlling of the egress gateway to stop routing the new requests is in a case where the scaling decision is the scaling in decision;

control the server controller circuit to determine, that tasks in an execution state in the at least one application server instance are completed, before the at least one application server instance is un-deployed,
  wherein the determination that the tasks in the at least one application server instance are completed is in the case where the scaling decision is the scaling in decision; and
control the first computing system to un-deploy the at least one application server instance after the tasks in the at least one application server instance are determined as completed, wherein the at least one application server instance is undeployed in the case where the scaling decision is the scaling in decision.

7. The computer system of claim 6, wherein the program instructions further cause the at least one computer processor to
  control transmission, from the request controller circuit based on a determination that the number of requests at the ingress gateway of the second computing system is larger than the upper threshold, of a scaling out request which requests to increase the number of instances in the set of application server instances.

8. The computer system of claim 6, wherein the workload information indicates at least one of:
  a number of connections established at the first computing system,
  a number of a plurality of tasks processed at the first computing system, wherein the plurality of tasks includes the tasks
  resource consumption at the first computing system, and
  the number of requests received at the first computing system.

9. The computer system of claim 7, wherein the program instructions further cause the at least one computer processor to:
  based on a determination that the scaling out request is transmitted which requests to increase the number of instances in the set of application server instances and a determination that the scaling decision is the scaling out decision which indicates provision of at least one additional application server instance is allowed,
  control the first computing system to deploy the at least one additional application server instance; and
  control the second computing system to accept the new requests.

10. The computer system of claim 7, wherein the program instructions further cause the at least one computer processor to
  control the request controller circuit of the second computing system to reject the number of requests based on the determination that the number of requests is larger than the upper threshold and a determination that:
    the scaling out request is transmitted which requests to increase the number of instances in the set of application server instances, and
    the scaling decision is either the scaling in decision or the as-is decision, which indicates that provision of at least one additional application server instance is not allowed.

11. A computer program product, comprising:
one or more computer-readable storage media; and
program instructions stored on the one or more computer-readable storage media, the program instructions executable by a computing system to cause the computing system to perform a method comprising:
  training a predictor, based on a features representation generated from historical workload information and a historical scaling decision corresponding to the historical workload information, to minimize a difference between a predicted scaling decision and the historical scaling decision, wherein
    the historical scaling decision is mapped to a probability vector indicating one of a scaling out decision, indicating an as-is decision, or indicating a scaling in decision,
    the predictor generates the predicted scaling decision indicating whether to change a number of instances in a set of application server instances of a first computing system, and
    the predictor is a machine learning model;
  determining, by a request controller circuit, a number of requests at an ingress gateway of a second computing system is one of larger than an upper threshold or below a lower threshold, wherein
    the set of application server instances serves at least one application running in the second computing system;
  transmitting, by the request controller circuit, a scaling in request to the predictor in a case where the number of requests at the ingress gateway is below the lower threshold, wherein the scaling in request is to decrease the number of instances in the set of application server instances;
  obtaining, by the predictor, workload information from a server controller circuit of the first computing system based on the scaling in request, wherein the workload information is associated with the set of application server instances running in the first computing system, wherein the server controller circuit controls deployment of the set of application servers;
  determining, by the predictor, based on the workload information from the server controller circuit and the scaling in request, a scaling decision that is one of:
    the scaling in decision indicating that at least one application server instance of the set of application server instances is to be un-deployed, or
    the as-is decision or the scaling out decision indicating that un-deployment of the at least one application server instance is not allowed;
  controlling, the request controller circuit, an egress gateway of the second computing system to stop routing new requests to the at least one application server instance before the at least one application server instance is un-deployed, wherein
    the controlling of the egress gateway to stop routing the new requests is in a case where the scaling decision is the scaling in decision;
  determining, by the server controller circuit, that tasks in an execution state in the at least one application server instance are completed, before the at least one application server instance is un-deployed,
    wherein the determining that the tasks in the at least one application server instance are completed is in the case where the scaling decision is the scaling in decision; and
  un-deploying, by the first computing system, the at least one application server instance after the tasks in the at least one application server instance are determined as completed, wherein the at least one application server instance is undeployed in the case where the scaling decision is the scaling in decision.

12. The computer program product of claim 11, wherein the method further comprises transmitting, based on a determination that the number of requests at the ingress gateway of the second computing system is larger than the upper threshold, a scaling out request which requests to increase the number of instances in the set of application server instances,
  wherein the controlling of the second computing system further comprises
    controlling, by the request controller circuit, the second computing system to reject the number of requests based on a determination that:
      the number of requests is larger than the upper threshold,
      the scaling out request is transmitted which requests to increase the number of instances in the set of application server instances, and
      the scaling decision is either the scaling in decision or the as-is decision, which indicates provision of at least one additional application server instance is not allowed.

13. A computer-implemented method, comprising:
  training a predictor to minimize a difference between a predicted scaling decision and a historical scaling decision, wherein
    the predictor is trained based on historical workload information, and the historical scaling decision corresponding to the historical workload information, and
    the predictor generates the predicted scaling decision indicating whether to change a number of instances in a set of application server instances of a first computing system;
  transmitting, by a request controller circuit of a second computing system, a scaling in request to the predictor based on a number of requests at an ingress gateway of the second computing system, wherein the set of application server instances serves at least one application of the second computing system;
  obtaining, by the predictor, workload information from a server controller circuit of the first computing system based on the scaling in request, wherein the workload information is associated with the set of application server instances;
  determining, by the predictor, based on the workload information and the scaling in request, a scaling decision that is one of:
    a scaling in decision indicating that at least one application server instance of the set of application server instances is to be un-deployed, or
    an as-is decision or a scaling out decision indicating that un-deployment of the at least one application server instance is not allowed;
  controlling, by the request controller circuit, an egress gateway of the second computing system to stop routing new requests to the at least one application server instance before the at least one application server instance is un-deployed, wherein
    the controlling of the egress gateway to stop routing the new requests is in a case where the scaling decision is the scaling in decision;
  determining, by the server controller circuit, that tasks in an execution state in the at least one application server instance are completed, before the at least one application server instance is un-deployed,
    wherein the determining that the tasks in the at least one application server instance are completed is in the case where the scaling decision is the scaling in decision; and
  un-deploying, by the first computing system, the at least one application server instance after the tasks in the at least one application server instance are determined as completed, wherein the at least one application server instance is undeployed in the case where the scaling decision is the scaling in decision.

* * * * *